United States Patent [19]

Schwarzmuller-Joch et al.

[11] 3,739,206
[45] June 12, 1973

[54] STEPWISE RUNNING ELECTROMAGNETIC MOTOR

[75] Inventors: Marlyse Schwarzmuller-Joch, Bienne; Michel Schwab, Port, both of Switzerland

[73] Assignee: Omega Louis Brendt & Frere S.A., Bienne, Canton of Bern, Switzerland

[22] Filed: Jan. 4, 1972

[21] Appl. No.: 215,378

[52] U.S. Cl. .............................................. 310/49
[51] Int. Cl. ......................................... H02k 37/00
[58] Field of Search ..................... 310/49, 46, 162, 310/163, 164, 165, 268; 318/138

[56] References Cited
UNITED STATES PATENTS

| | | | |
|---|---|---|---|
| 3,483,406 | 12/1969 | Inaba | 310/49 |
| 3,469,123 | 9/1969 | Inaba | 310/49 |
| 3,005,118 | 10/1961 | Ranseen | 310/49 |
| 2,797,346 | 6/1957 | Ranseen | 310/49 |

*Primary Examiner*—R. Skudy
*Attorney*—I. Irving Silverman, Myron C. Cass, Sidney N. Fox and Thomas R. Vigil

[57] ABSTRACT

The stepwise running motor includes a disc shaped rotor having a plurality of magnets arranged in a generally circular manner. The magnets are of alternating plurality and the field of the magnets follows a direction parallel to the shaft of the rotor. The rotor is located between two annular pole pieces each of which has a plurality of pole shoes also arranged in a generally circular manner, the number of pole shoes being equal to half the number of the magnets of the rotor. The axial side of each of the shoes which faces the rotor between the pole pieces is cut at least partially slantwise with respect to a plane at a right angle to the motor shaft such that a transient magnetic field generated in the polar pieces produces stepwise forward motion of the rotor.

5 Claims, 2 Drawing Figures

STEPWISE RUNNING ELECTROMAGNETIC MOTOR

The present invention relates to a stepwise running electromagnetic motor.

This motor is characterized by the fact that it comprises a disc shaped rotor which carries a plurality of magnets arranged in a crown like manner, said magnets being of alternating polarity and the field of which follows a direction parallel to the shaft of said rotor, the latter being located between two annular polar pieces each being provided with pole shoes also arranged in a crown like manner and opposite which said magnets are moving when the rotor is running, the axial side of said shoes which faces the rotor being cut at least partially slantwise with respect to a plane at right angle to the motor shaft, so that a transient magnetic field generated in said polar pieces produces the stepwise forward motion of the rotor.

The drawing represents, as an example, a preferred embodiment of the object of the invention.

Figure 1:
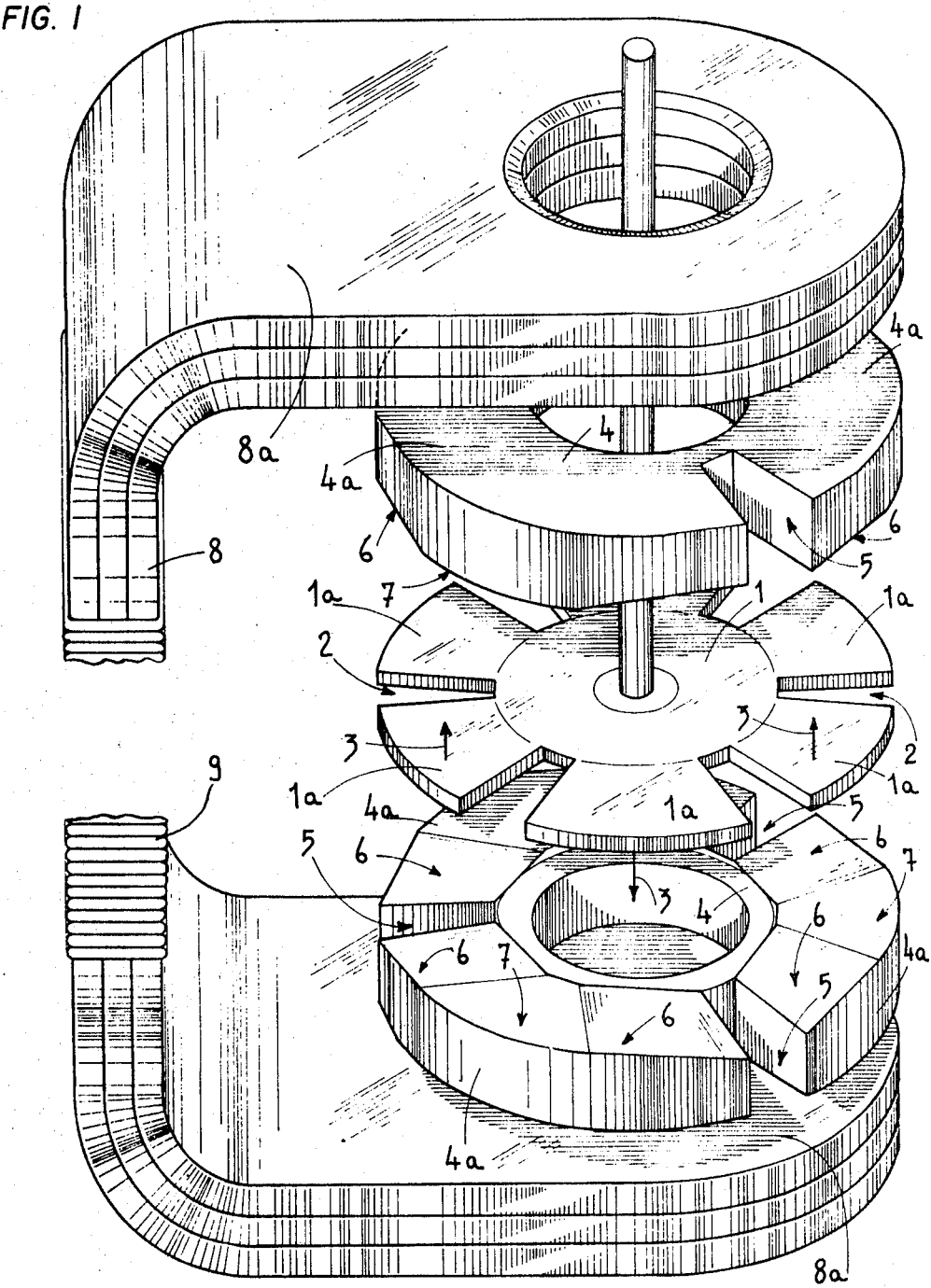
FIG. 1 is an exploded perspective view of a stepwise running motor.
Figure 2:
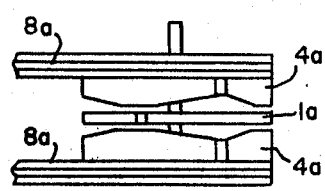
FIG. 2 is a compact side view with portions broken away of the motor as assembled.

The stepwise running motor represented comprises a rotor 1 made up of a thin disc of platinum cobalt, ferrite or any other material having a high coercive field. This disc is cut so as to be provided, at its periphery, with a series of radial notches 2 and, between them, crown segments 1a, which constitute a plurality of magnets with alternating polarity and having their field in a direction parallel to the shaft of the rotor as indicated by the arrow 3.

The latter turns between two annular polar pieces 4 each of which is provided with radial notches 5 and, between them, crown segments 4a which constitute pole shoes opposite which the magnets 1a are moving when the rotor 1 is running.

The side of each of the pole shoes 4a which faces the rotor 1 is provided with two inclined planar surfaces 6, having opposite slopes, each surface being in a position adjacent to one of the notches 5 which limit said pole shoes, the inclined planar surfaces 6 adjacent each notch 5 lying in planes which form a convex dihedron; the inclined surfaces on each shoe 4a are separated by a flat portion 7 lying in a plane at a right angle to the motor shaft.

The polar pieces 4 are attached to the ends 8a of a bracket like armature 8, built up of stacked sheet metal. There is a winding 9 around the middle part of the armature 8.

The number of the shoes 4a of each polar piece 4 is half the number of the magnets 1a carried by the rotor 1. In the present embodiment, there are three shoes 4a and six magnets 1a, but this ratio could also be, for instance, four to eight.

At rest, the rotor is stopped, due to the influence of the magnetic field of its magnet 1a, in a position in which the magnets 1a face the inclined plane 6 of the shoes 4a.

If a transient magnetic field is generated in the armature 8 by the application, at the terminals of the winding 9, of pulses of alternating polarity, said pulses being relatively short, e.g. of the order of 10 to 30 milliseconds, and having a frequency of the order of 1 Hz, the rotor is subjected, at the time each impulsion occurs, and because of the inclined surfaces 6 of the shoes 4a, to a force which makes it turn an angular distance corresponding to its division, e.g. to the number of its magnets 1a. The rotor stops in the next stable position until the next pulse, the polarity of which is opposite to that of the previous one, pushes it one step forward.

What we claim is:

1. Stepwise running electromagnetic motor characterized by the fact that it comprises a disc shaped rotor which carries a plurality of magnets arranged in a generally circular manner, said magnets being of alternating polarity and the field of which follows a direction parallel to the shaft of said rotor, the latter being located between two annular polar pieces each being provided with pole shoes also arranged in a generally circular manner, the number of which is equal to half the number of magnets of the rotor, and opposite which said magnets are moving when the rotor is running, the axial side of said shoes which faces the rotor being cut at least partially slantwise with respect to a plane at right angle to the motor shaft, so that a transient magnetic field generated in said polar pieces produces the stepwise forward motion of the rotor.

2. Stepwise running electromagnetic motor as claimed in claim 1, characterized by the fact that the disc constituting the rotor is provided, at its periphery, with a series of radial notches, and, between them, a series of crown segments constituting said magnets.

3. Stepwise running electromagnetic motor as claimed in claim 1, characterized by the fact that each of the polar pieces is generally annular having, at its periphery, a series of radial notches, and between them, crown segments which constitute said pole shoes.

4. Stepwise running electromagnetic motor as claimed in claim 3, characterized by the fact that each pole shoe is provided, on its side facing the rotor, with two inclined surfaces each ajdacent to one of the the notches limiting said shoe, the planar surfaces adjacent each notch lying in planes forming, between them, a convex dihedron.

5. Stepwise running electromagnetic motor according to claim 4, characterized by the fact that the inclinded plane of each pole shoe is separated, in the middle of said shoe, by the flat portion lying in a plane which is at substantially a right angle to the motor shaft.

* * * * *

UNITED STATES PATENT OFFICE
CERTIFICATE OF CORRECTION

Patent No. 3,739,206   Dated June 12, 1973

Inventor(s) Marlyse Schwarzmuller-Joch, et al.

It is certified that error appears in the above-identified patent and that said Letters Patent are hereby corrected as shown below:

First page of Patent after "(21) Appl. No.: 215,378" insert --(30) Foreign Application Priority Data 786/71 January 19, 1971 Switzerland--

Signed and sealed this 12th day of March 1974.

(SEAL)
Attest:

EDWARD M. FLETCHER, JR.
Attesting Officer

C. MARSHALL DANN
Commissioner of Patents